INVENTORS
CLYDE E. INGALLS
ROBERT I. HULSIZER

BY

ATTORNEY

INVENTORS
CLYDE E. INGALLS
ROBERT I. HULSIZER

BY *M. O. Hayes*

ATTORNEY

Patented Aug. 24, 1954

2,687,472

UNITED STATES PATENT OFFICE 2,687,472

AUTOMATIC GAIN CONTROL CIRCUIT

Clyde E. Ingalls, Canisteo, N. Y., and Robert I. Hulsizer, Belmont, Mass., assignors, by mesne assignments, to the United States of America as represented by the Secretary of the Navy Application September 18, 1946, Serial No. 697,718

12 Claims. (Cl. 250—20)

1

This invention relates in general to automatic gain control circuits for apparatus such as radar receivers and more particularly to such automatic gain control circuits which maintain the phase relation of error signals when used in automatic tracking radar systems.

Automatic radar tracking systems are in use which select a desired target, follow the selected target, and produce range and direction signals for any desired purpose, such as directing guns. In fire control applications, extreme accuracy is required. Here it is necessary to supply continuous data, or data at very short intervals relating to azimuth, range and elevation, and these data are applied to a predictor to control the guns. A system employing a conical scan has been found best for such application. The pattern in space appears as a lobe rotated off-center, and is such that there is only one antenna direction where any selected target will return constant signals regardless of the instantaneous direction of the conically scanning beam. This method of conical scanning yields information regarding both the azimuth and the elevation of the selected target, and at the same time range data may be obtained by measuring the time interval between the transmission and reception of the pulses of which the transmitted signal (in this case) consists.

In systems of this general form, a signal is obtained from the receiver that is proportional to the error in the instantaneous aim of the antenna and is employed to reorient correctly and automatically the antenna aim. Similarly range error signals are obtained and use to correct the range data supplied to the predictor. Thus the antenna is kept pointed at the target and the range data is kept accurate to provide the necessary data for the gun predictor.

In tracking a selected target the strength of the echo pulses varies slowly with the relative motion of the selected target with respect to the radar. The strength of the echo pulses also changes rapidly due to fading, target aspect, and the like. In addition, the echo pulses are amplitude modulated as the scanning antenna passes over the target. This modulation is at low rate depending on the scanning speed. The phase of the modulation also varies depending on which direction the antenna is off the target.

Steady output signals from the receiver I.-F. amplifier increase the accuracy of range measurement and decrease the required range of subsequent amplifiers so that non-linear operation is obviated. In providing automatic gain control for such a system it is necessary to retain the phase of the antenna error signal to insure proper circuit operation.

2

It is thus an object of this invention to provide means for rapidly and automatically controlling the gain of a radar receiver without interfering with other data contained in the output of said receiver.

Another object of this invention is to provide means for slowly varying the gain of a radar receiver without interfering with the pulse data of said receiver.

Another object of this invention is to provide means for producing a range error voltage for use in automatic tracking.

A still further object of this invention is to provide means for obtaining a direction error signal for use in automatic tracking.

These and other objects will be apparent from the following specification when taken with the accompanying drawing in which.

Figure 1:
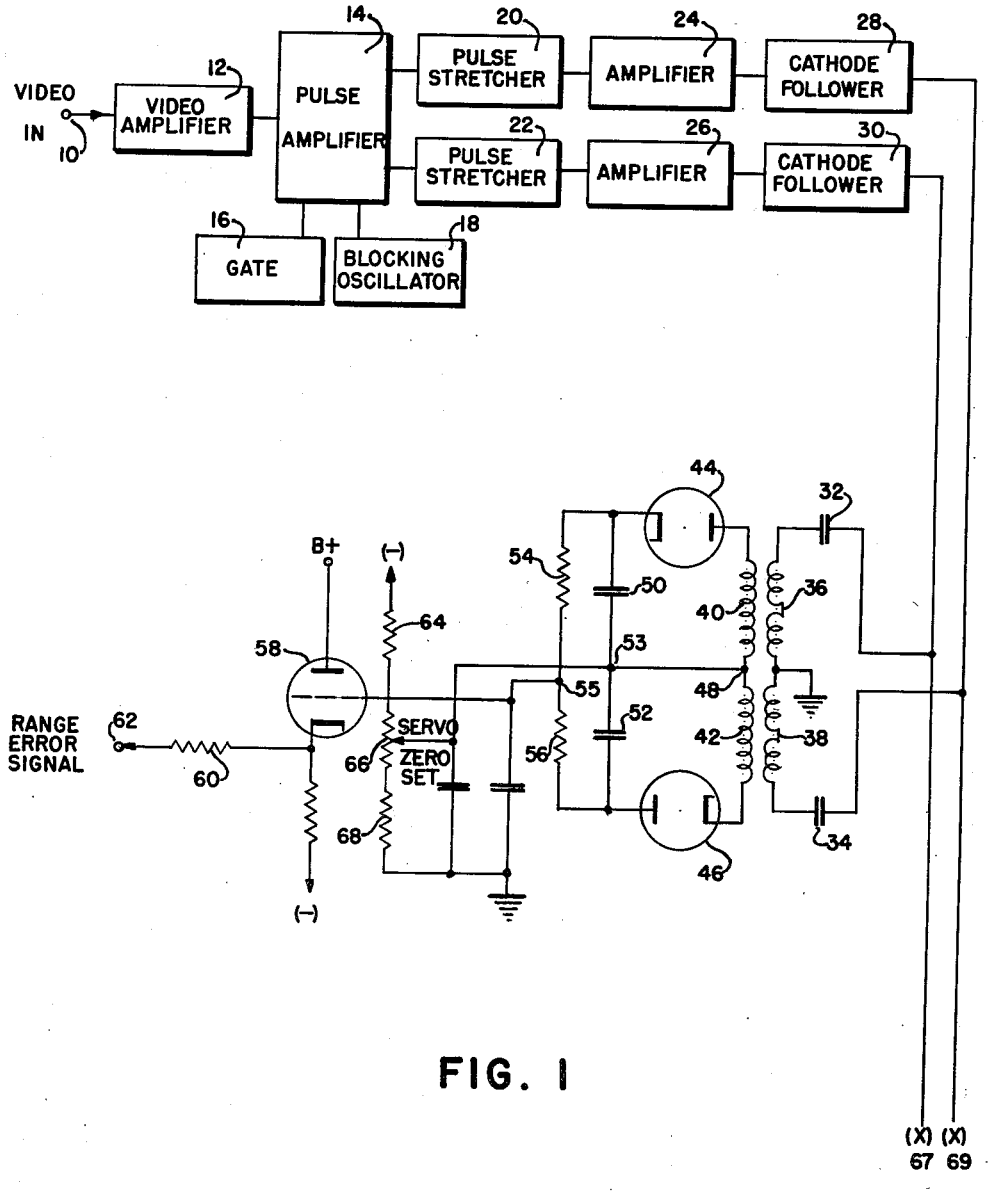
Fig. 1 illustrates part of the invention in one form.

A brief description will be given before going into the details of the invention. The purpose of the system is to give the pulse output signals of the receiver an essentially constant, predetermined amplitude while also providing for the demodulation of the direction error voltage and, in one embodiment, the range error voltage. Video signals from the receiver are amplified and a certain target signal is selected by a gate. This gated signal is used to charge a capacitor very rapidly through diodes by means of wideband circuits. The diodes open-circuit at the end of the signal pulse and allow the capacitors to discharge through large resistors. Any portion of each pulse during the decay period is proportional to the peak amplitude of the received pulse. The difference between these two pulses is used to determine the range error. These same two pulses are used to produce the automatic gain control (AGC) signals which are applied through a resistance capacitance network to form a pulse equal to the average pulse voltage of the two previous pulses and of the same shape. This pulse is used to charge a relatively large capacitor, through a switch tube arrangement, to a voltage equal to the voltage of some predetermined portion of the stretched pulses. This capacitor charges or discharges rapidly to a voltage governed by the input pulse voltage. The switch tubes are allowed to conduct for only a short period at the time of the selector gate. The large capacitor is charged to essentially full stretched pulse voltage and remains at that voltage until the next pulse occurs.

The double stretching produces higher gain and reduces power consumption. Thus the peak voltage of the selected pulse is first measured, then held long enough to give a normal sized tube time to charge the large capacitor. The voltage across the large capacitor will appear as a series of steps that go up and down with the selected receiver input signals, each step lasting for the period between signals, and the change in height of steps being proportional to the change in height of input signals. This type of voltage wave does not require as much filtering to take out the high frequencies and results in a faster acting automatic gain control. This step voltage is applied to a low pass filter of low time constant to remove the high frequencies so that oscillations due to the feedback loop may be prevented. The output from the filter is fed through a cathode follower to the grids of some intermediate frequency tubes to control the gain of the I.-F. amplifier. This output also contains direction error signal voltages which are taken out at this point. The first filter ouput is also fed to a second low pass filter of long time constant, which filters out the direction error signal, and then to more of the I.-F. stages to control their gain. A sensitivity time control voltage is fed from a low impedance source to the same I.-F. stages through the larger capacitor of the filter.

Several I.-F. stages are controlled by the AGC to prevent overload on any of the stages. Provisions are also included for setting the initial levels of both AGC biases and for manual gain control.

Figure 2:
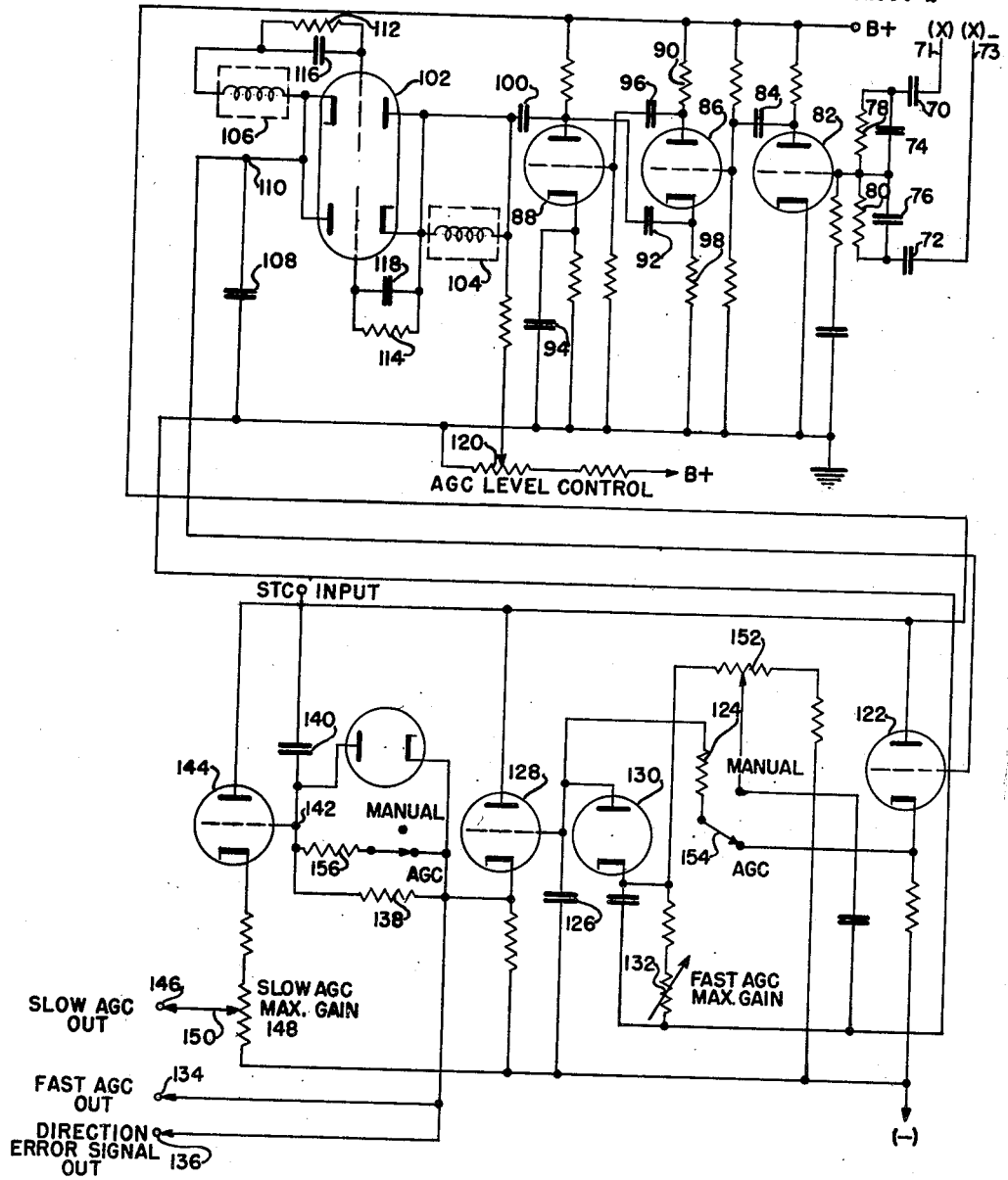
Fig. 2 is a continuation of Fig. 1 and illustrates the remaining part of the invention in a desired form.

The invention will now be described in greater detail with reference to Figs. 1 and 2. Referring first to Fig. 1, video pulses are applied at terminal 10 from a radar receiver, not shown. These are amplified by a wideband video amplifier 12 and then applied to a pulse amplifier 14. This pulse amplifier may comprise two tubes with control grids operated in parallel and plates operating in two separate but similar circuits. These two amplifier tubes are normally non-conducting except at the time the desired signal arrives at the grids. Just before the desired signal occurs a comparatively slow positive pulse of voltage, or gate, is applied by a gate circuit 16. This gate lasts slightly more time than the period of the signal. While this gate is on, a second gate is applied to the pulse amplifier 14 by a blocking oscillator circuit 18. This second gate has very steep sides and lasts for about half of the period of the signal pulse. The second gate is applied directly to one of the tubes of pulse amplifier 14 but is delayed for a period equal to the gate length before being applied to the other tube of pulse amplifier 14 so that the end of the gate to one tube occurs at the time of the start of the gate at the other tube. This point at the end of one gate and the beginning of the other is centered on the peak of the signal pulse applied to the control grids of the tubes. Thus, the first half of the signal pulse is amplified by one tube and the last half is amplified by the other. If the point of symmetry of the two gates should be shifted from the center of the signal, such as happens when the signal target changes in range, the height and length of the pulse output from one tube will be greater than that of the other. This difference in output is later used to operate the range servos for automatic range tracking and is also later combined and used to furnish the AGC voltage. The output of the two gated tubes of amplifier 14 feeds into two identical pulse stretching circuits 20 and 22. The two circuits 20 and 22 contain capacitors which charge very rapidly and discharge slowly. Each circuit must charge fast enough to have a charging bandwidth the same as the other video circuits to operate in the presence of certain types of jamming.

The purpose of the pulse stretching operation is to obtain a voltage proportional to and as nearly equal to the peak voltage as practical, the stretched voltage to be of sufficient time duration to allow the charging of a very long time constant circuit with tubes of reasonable size.

The output of the gated tubes of pulse amplifier 14 contains a large component of the gate voltage. If this voltage were allowed to pass through the amplifier it would severely tax the dynamic range of the amplifier tubes and require larger tubes. To eliminate this voltage from the rest of the amplifier the diodes of the pulse stretching circuits 20 and 22 are biased to a value which allows only enough to pass through to be sure that the whole signal pulse height is utilized.

The stretched pulses from the stretcher circuits 20 and 22 are applied to amplifier circuits 24 and 26. Amplifiers 24 and 26 do not require exceedingly wide bandwidths since the stretched pulses do not need to rise so rapidly as long as they reach their peak before the gate to the staircase generator to be discussed next. Advantage is taken of this time to obtain extra gain. The two amplifiers 24 and 26 are biased to balance the gain of both. The output of amplifiers 24 and 26 is applied to two cathode follower circuits 28 and 30. The output from cathode followers 28 and 30 is fed to a range discriminator circuit and the remainder of the AGC circuit. The output signal from the cathode followers 28 and 30 is split into two parts by the gates of the signal selector circuits. When the gates are set at the proper range the two parts of the signal are of equal voltage, but when the gates are in error in range the two parts of the signal have unequal voltages. These two voltages are compared and the difference is used to operate the range servos, not shown.

At the output of cathode followers 28 and 30 the voltages are of the same sign, which is positive. The signals are coupled through capacitors 32 and 34 to windings 36 and 38 of a pulse transformer to ground and thence to the secondary windings 40 and 42. The sign of the voltage from winding 40 is preserved and applied to the plate of diode 44. The sign of the voltage from winding 42 is reversed and applied to the cathode of diode 46. The common junction 48 of windings 40 and 42 connects at junction 53 to one side of each of the diode output filter capacitors 50 and 52. This connection is used as the low potential side of the output. Diode load resistors 54 and 56 are connected across from the cathode of diode 44 to the plate of diode 46. The common junction 55 of resistors 54 and 56 serves as the high voltage output. If the pulse voltages applied to the diodes 44 and 46 are equal, the diode output voltages will be equal and the junction 55 of the two load resistors will be half way between these two equal and opposite voltages, or at the same potential as the low potential terminal 53. If the pulse voltages are unequal, junction 55 of the two load resistors 54 and 56 will have a potential with respect to the low potential terminal 53 of half the difference in the diode output voltages and of the sign of the higher diode output voltage. This is the range error voltage and is applied to the range servo from terminal 62 through cathode follower 58 and resistor 60. Voltage divider 64, 66, and 68 provides a means of setting the zero position of the range servo at variable resistor 66.

The remainder of the invention will now be described with reference to Fig. 2, which is a continuation of Fig. 1. The output from cathode followers 28 and 30 at terminals 67 and 69 (Fig. 1) is also applied to the circuit of Fig. 2 at terminals 71 and 73. This input is applied through a resistance capacitor network composed of capacitors 70, 72, 74, 76 and resistors 78, 80 to the remainder of the AGC circuit. This network is designed to present a reasonably high impedance to the cathode follower tubes and serves to apply a pulse to the grid of amplifier tube 82 equal in voltage to the average pulse voltage of the two channels, and of the same shape. Amplifier 82 applies a negative pulse through capacitor 84 to the grid of tube 86.

Tube 86 along with tube 88 and their associated circuit elements form a power amplifier with very low output impedance. The alternating current circuit of this low impedance power amplifier is such that the two tubes form a voltage divider between B+ and ground. (The circuit starting at B+ goes through the tube to the cathode, through a by-pass capacitor 92 to the plate of tube 88, through tube 88 to its cathode and thence through a by-pass capacitor 94 to ground.) The grid of tube 88 connects through capacitor 96 to the plate of tube 86. With no signal on its grid, tube 86 conducts heavily. Tube 88 is nearly cut off. When a pulse is applied to tube 86 its cathode goes negative, and its plate goes positive to make tube 88 conduct heavily which in turn helps the cathode of tube 86 to go negative. Thus, it is seen that the second tube 88 is a load resistor for the tube 86, and tube 86 is operated as a cathode follower. Since the tube 86 is a cathode follower and tube 85 is aiding it, it is seen that the combination has a very low output impedance.

In addition the circuit using tubes 86 and 88 functions well in charging and discharging a capacitor. Suppose that a capacitor is connected across the output of tube 88 and that an incoming pulse is such as to drive the output considerably more negative than the existing output voltage. Since the capacitor cannot discharge to the new value instantaneously the tube 86 is driven to cutoff. If tube 88 were not present, the capacitor would have to discharge at a rate determined by the capacitor and the cathode resistor 98. However, the tube 88 is made highly conductive at the same time the first tube is cut off, so that the capacitor discharges quickly through the second tube. If the incoming pulse to tube 86 is such as to make the cathode more positive, the grid of tube 86 will have a very small bias, or it may even be positive with respect to its cathode, which makes the first tube conduct heavily and the output capacitor charges rapidly to the new value through tube 86 and its plate resistor 90. Meanwhile, tube 88 is cut off so it does not draw current to retard the charging process. If the capacitor is not across the output at the start of a pulse but is switched across during the time the pulse is applied to tube 86 the same action will take place. The only difference is that the cathode voltage of tube 86 is changed with respect to the grid instead of the grid voltage being changed.

The plate of tube 88 is coupled through capacitor 100 to one plate of duo-triode 102 and to the opposite cathode. The opposite plate and cathode of tube 102 are tied together and a large capacitor 108 is connected from there to ground. The two sections of tube 102 are connected in reverse directions so that capacitor 108 may either charge or discharge readily. Windings 104 and 106 of a blocking oscillator circuit, not shown, are used to control the operation of duo-triode 102. They furnish sufficient voltage to drive the grids of tube 102 highly positive regardless of its cathode potentials. The impedance of the grid circuits, however, is made high by means of grid leak resistors 112 and 114 and capacitors 116 and 118 so that the blocking oscillator can only drive the grids to give slight grid current. This prevents the blocking oscillator from determining the voltage at point 110. The blocking oscillator circuit, not shown, which operates shortly after the stretched pulse reaches its peak at the grid of tube 86 causes tube 102 to conduct. Switch tube 102 is kept on just long enough for the capacitor 108 to reach practically its possible final value. The blocking oscillator then turns off the switch tube 102 until the next signal pulse. The voltage at 110 across capacitor 108 is thus a staircase type voltage, the height of each step from a base line being proportional to the corresponding input pulse height or voltage. This output is different from the "boxcar" type output which momentarily goes down to the base line just before each pulse. The staircase ouput voltage requires little filtering to remove the high frequencies and thus increase the overall response of the AGC circuit.

The direct current level must be set at this point since the A.-C. components are no longer proportional to signal pulse height after this point. The D.-C. level is set by potentiometer 120 which sets the voltage at the input side of switch tube 102. The resistance of this voltage source must be low enough so that variable currents through this circuit will not appreciably affect the voltage. The staircase voltage then at point 110 is varying about a D.-C. baseline set by potentiometer 120. This voltage is applied to cathode follower 122 for purposes of isolation. From the cathode of tube 122 the staircase voltage is applied to a fast time constant filter to remove the high frequencies from the AGC signal. The filter consists of series resistor 124 and shunt capacitor 126. The output of this filter is applied to the grid of a cathode follower tube 128. Diode 130 supplies an AGC delay bias and prevents the AGC output from going more positive than a given negative value. This maximum value is set by fast AGC potentiometer 132.

The fast AGC voltage is taken out at terminal 134 from the cathode of cathode follower 128. The alternating direction error signal in the form of amplitude modulation of said output voltage is taken out at terminal 136 from the cathode of the same tube.

Resistor 138 and capacitor 140 constitute a slow AGC filter to remove the direction error signals. Capacitor 140 instead of connecting to ground or the negative reference level connects to the output of a cathode follower tube (not shown) which has a low output impedance. The cathode follower tube is fed by a tube which generates a voltage which varies in magnitude with time in such a manner as to reduce the gain of the receiver at the time the system transmits a pulse, and gradually increases the gain with time so that, for example, a medium sized plane flying out from zero range will give a constant amplitude signal at the output of the receiver. This control is called a "Sensitivity Time Control."

The output from the long time constant filter at point 142 is applied to a cathode follower 144 to obtain a low impedance output for the slow AGC voltage at terminal 146. The slow AGC is taken from cathode resistor 148 instead of directly from the cathode of tube 144 to make the slow AGC D.-C. potential the same as the D.-C. potential of the fast AGC output. It is made adjustable by tap 150 to compensate for variations between different tubes.

The fast AGC output is fed to two I.-F. stages of the receiver and the slow AGC voltage is supplied to two other I. F. stages. This is done to keep the controlled I.-F. tubes from operating on the sharply curved portions of their characteristics and to prevent overload of these tubes and others.

Manual gain control is obtained by switching the input of the fast AGC filter (resistor 124 and capacitor 126) to potentiometer 152, by means of switch 154, which furnishes the required variable voltage. Since the manually set bias voltage has no delay it does not make use of the delay bias diode 130. This diode bias circuit must have low impedance to prevent a large discrepancy in maximum gain caused by the change in current in this diode circuit when switching from manual to automatic gain control or vice versa. The long time constant resistor 138 is shunted by resistor 156 when manual gain control is used to prevent the control from acting sluggish.

Thus it is seen that this invention provides means for controlling the gain of a radar receiver at both slow and rapid rates to maintain constant signal output under all conditions and at the same time produces range and direction error signals which may be used to make the radar automatically track any selected target.

It is believed that the construction and operation as well as the advantages of this improved automatic gain control circuit will be apparent from the foregoing detailed description thereof. It will also be apparent that while the invention has been shown and described in a preferred form changes may be made in the circuits disclosed without departing from the spirit of the invention as sought to be defined in the following claims.

What is claimed is:

1. In a radar receiver, means for periodically receiving echo pulse signals, means for selecting periodic target pulses from said echo signals, means responsive to said target pulses for producing an output signal having a substantially constant amplitude proportional to the amplitude of said target pulse and having a duration corresponding to the period between successive target pulses, a power amplifier having low impedance output, a capacitor in the output circuit of said power amplifier, means for applying said output signal to said power amplifier whereby said capacitor is substantially instantaneously charged to a potential proportional to the amplitude of said output signal, means for coupling said capacitor potential to a first filter having a comparatively short time constant, the output of said filter providing a first automatic gain control signal for said receiver, and means for coupling a portion of the output of said short time constant filter to a second filter having a comparatively long time constant, the output of said last-mentioned filter providing a second automatic gain control signal for said receiver.

2. Apparatus as in claim 1 and including switching means for limiting the charging time of said capacitor.

3. In a radar receiver, means for selecting a periodic target pulse, a target range tracking circuit including means for dividing said target pulse into two pulses having amplitudes related to target range, means for stretching in time each of said two pulses, means for averaging said stretched pulses, a power amplifier driven from said pulse averaging means, a capacitor in the output circuit of said power amplifier, a first resistance-capacitance filter having a relatively short time constant, a first cathode follower coupling said capacitor to said first filter, the output of said first filter providing a fast automatic gain control signal for said receiver, a second resistance-capacitance filter having a relatively long time constant, a second cathode follower coupling the output of said first filter to said second filter, the output of said second filter providing a slow automatic gain control signal for said receiver.

4. Apparatus as in claim 3 and including switching means coupling said power amplifier to said capacitor, said switching means being operative for a period less than the period of the signal output of said averaging means.

5. Apparatus as in claim 3 and including switching means coupling said capacitor to said power amplifier, said switching means when operative permitting charge or discharge of said capacitor through said power amplifier, said power amplifier output circuit having low impedance whereby said charge or discharge of said capacitor is effected at relatively short time constant.

6. In a pulse receiver having range gating means to select a signal pulse from a particular target, an automatic gain control circuit comprising, means for producing a stretched pulse having a substantially constant amplitude proportional to the amplitude of the selected pulse. a power amplifier connected and arranged to have low output impedance, means for applying said stretched pulse to said power amplifier, a relatively large storage capacitor, switching means connected between said power amplifier and said capacitor, means controlled by said range gating means to actuate said switching means for a period less than the period of said stretched pulse to permit substantially instantaneous charge or discharge of said capacitor through said power amplifier, said capacitor being arranged to maintain a charge thereon between successive periods of operation of said switching means at a potential determined by the amplitude of said stretched pulse at the instant of each switching operation, and means including a filter coupled to said capacitor for deriving an automatic gain control signal for said receiver.

7. In a pulse receiver including means for selecting a pulse signal from a particular target, an automatic gain control circuit comprising, means for producing a stretched pulse having a magnitude proportional to the peak amplitude of the selected pulse and the duration corresponding to the interval between successive selected pulses, a power amplifier arranged to have low output impedance, means for applying said stretched pulse to said power amplifier, a capacitor, a switching circuit coupled between said power amplifier and said capacitor, means for actuating said switching circuit for a period less than the duration of said stretched pulse for substantially instantaneously charging said condenser to a potential proportional to the amplitude of a selected portion of said stretched pulse, and means including a filter having a comparatively short time constant coupled to said capacitor for deriving a fast automatic gain control signal for said receiver.

8. In a pulse receiver having range gating means to select pulse signals from a target at a particular range, an automatic gain control circuit comprising, means for providing an output pulse having substantially constant amplitude proportional to the amplitude of said selected pulses during the period between said selected pulses, a power amplifier having low output impedance, means applying said output pulse to said power amplifier, a storage capacitor, switching means including a pair of electron tubes each having at least an anode, a cathode and a control grid, means connecting the output terminal of said power amplifier to the anode of one and to the cathode of the other of said tubes, means connecting the cathode of said one and the anode of said other of said tubes to said storage capacitor, means coupled to the control grids of said tubes for periodically actuating said switching means for a period less than the duration of said output pulses, thereby permitting charge or discharge of said capacitor through said power amplifier at relatively short time constant, said capacitor being arranged to maintain a charge thereon between successive periods of operation of said switching means at a potential level proportional to the amplitude of said output pulses, and means including a filter coupled to said capacitor for deriving an automatic gain control signal for said receiver.

9. In a range tracking system including a pulse receiver having range gating means arranged to select a pulse signal from a particular target and to divide said pulse signal into two pulses having amplitudes related to target range, an automatic gain control circuit comprising, means for separately extending the durations of said two pulses, means for combining said extended pulses to produce a single extended pulse having an amplitude proportional to the average amplitude of said two pulses, a power amplifier constructed and arranged to have low output impedance, means for applying said single voltage pulse to said power amplifier, a relatively large storage capacitor, bilateral switching means coupling said power amplifier to said capacitor, means controlled by said range gating means for periodically actuating said switching means for a period less than the duration of said single extended pulse to permit substantially instantaneous charge or discharge of said capacitor through said power amplifier to a potential level determined by the amplitude of said single extended pulse, and means including a filter coupled to said capacitor for deriving an automatic gain control signal for said receiver.

10. In a pulse receiver having range gating means to select a pulse signal from a particular target and dividing said selected pulse into two pulses having amplitudes related to target range, an automatic gain control circuit comprising a pair of pulse stretching circuits for respectively extending the durations of said two pulses, means for averaging said stretched pulses to produce a single pulse having an amplitude proportional to the average of said two stretched pulses, a power amplifier arranged to have a low output impedance, means coupling said averaging means to said power amplifier, a capacitor, switching means coupling said power amplifier to said capacitor, means controlling said switching means for a period less than the duration of said single pulse whereby said capacitor is charged in step-like fashion, means including a low pass filter coupled to said condenser for deriving a fast automatic gain control receiver for said receiver, and means including a second filter having a relatively long time constant coupled to the output of said low pass filter for deriving a slow automatic gain control signal for said receiver.

11. In a range tracking system including a pulse receiver having range gating means arranged to select a pulse signal from a particular target and to divide said pulse signal into two pulses having amplitudes related to target range, an automatic gain control circuit for said receiver comprising means for separately amplifying and similarly extending the durations of said two pulses, means for combining said extended pulses to produce a single extended voltage pulse having an amplitude proportional to the average amplitude of said two pulses, a power amplifier including first and second electron tubes, said second tube being connected in the cathode circuit of said first tube thereby to provide a low output impedance for said power amplifier, means for applying said single extended pulse to said first tube, means biasing said first and second tubes whereby said second tube conducts heavily during the application of said single extended pulse to said first tube, a relatively large storage capacitor, bilateral switching means connected between said power amplifier and said capacitor, means for periodically actuating said switching means for a period less than the duration of said single extended pulse to permit substantially instantaneous charge or discharge of said capacitor through said second tube of said power amplifier to a potential level determined by the amplitude of said single extended and amplified pulse, means including a filter having a short time constant coupled to said capacitor for deriving a fast automatic gain control signal for said receiver, and means for biasing said switching means to establish the desired potential level for said gain control signal.

12. Apparatus in accordance with claim 11 wherein said switching means comprises a pair of oppositely connected electron tubes each having an anode, a cathode and a control grid, the output of said power amplifier being applied to the anode of one of said tubes and to the cathode of the other of said tubes and said capacitor being connected to the cathode of said one tube and to the anode of the other of said tubes, and means coupled to the grids of said tubes and operated in timed relation with said range gating means for periodically rendering both of said tubes conducting.

References Cited in the file of this patent

UNITED STATES PATENTS

| Number | Name | Date |
| --- | --- | --- |
| 2,411,572 | Hershberger | Nov. 26, 1946 |
| 2,422,069 | Bedford | June 10, 1947 |
| 2,422,334 | Bedford | June 17, 1947 |
| 2,519,359 | Dean | Aug. 22, 1950 |
| 2,562,309 | Frederick et al. | July 31, 1951 |